3,328,119
SYNTHETIC CRYSTALLINE ALUMINO-BORO-
SILICATE ZEOLITES AND PREPARATION
THEREOF
Harry Edwin Robson, Baton Rouge, La., assignor to Esso
Research and Engineering Company, a corporation of
Delaware
No Drawing. Filed Sept. 18, 1963, Ser. No. 309,880
23 Claims. (Cl. 23—113)

This invention relates to synthetic crystalline zeolites and a process for their preparation. Particularly, it relates to synthetic crystalline alumino-silicate zeolites containing minor proportions of boria incorporated within their crystal lattice structures. More particularly, it relates to the use of said zeolites in hydrocarbon conversion processes.

Crystalline alumino-silicate zeolites, commonly referred to as "molecular sieves," are well known in the art. They are characterized by their highly ordered crystalline structure and uniformly dimensioned pores, and are distinguishable from each other on the basis of composition, crystal structure, adsorption properties and the like. The term "molecular sieves" is derived from the ability of these zeolite materials to selectively adsorb molecules on the basis of their size and form. The various types of molecular sieves may be classified according to the size of the molecules which will be rejected (i.e. not adsorbed) by a particular sieve. A number of these zeolite materials are described, for example, in U.S. Patent 3,013,982 wherein they are characterized by their composition and X-ray diffraction characteristics. In addition to their extensive use as adsorbents for hydrocarbon separation processes and the like, it has recently been found that crystalline alumino-silicate zeolites, particularly after cation exchange to reduce alkali metal oxide content, are valuable catalytic materials for various processes, particularly hydrocarbon conversion processes.

In general, the chemical formula of an anhydrous crystalline alumino-silicate zeolite, expressed in terms of moles may be represented as:

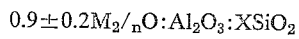
$$0.9 \pm 0.2 M_{2/n}O : Al_2O_3 : XSiO_2$$

wherein M is selected from the group consisting of metal cations and hydrogen, $n$ is its valence, and X is a number from about 1.5 to about 12. The value of X will vary with the particular zeolite in question. The zeolite as produced or found naturally normally contains an alkali metal such as sodium or an alkaline earth metal such as calcium. Among the well known natural zeolites are mordenite, faujasite, chabazite, gmelinite, analcite, erionite, etc. Such zeolites differ in structure, composition, and particularly in the ratio of silica to alumina contained in the crystal lattice structure; e.g. mordenite, having a ratio of about 8 to about 12; faujasite, having a ratio of about 2 to about 6; etc. Similarly, the various types of synthetic crystalline zeolites, e.g. synthetic faujasite, mordenite, etc., will also have varying silica to alumina ratios depending upon such variable as composition of crystallization mixture, reaction conditions, etc. U.S. Patents Nos. 3,013,982–86 describe a number of synthetic zeolites, designated therein as zeolite A, D, L, R, S, T, X and Y.

The processes for producing such crystalline synthetic zeolites are well known in the art. Typically, they involve crystallization from reaction mixtures containing: $Al_2O_3$ as sodium aluminate, alumina sol and the like; $SiO_2$ as sodium silicate and/or silica gel and/or silica sol; alkali metal oxide, e.g. sodium hydroxide, either free or in combination with the above components; and water. Careful control is kept over the alkali metal oxide concentration of the mixture, the proportions of silica to alumina and alkali metal oxide to silica, the crystallization period, etc., to obtain the desired product. For example, a conventional scheme for preparing crystalline sodium alumino-silicate zeolites is as follows:

Colloidal silica or silica hydrosol is mixed with a solution of sodium hydroxide and sodium aluminate at ambient temperatures to produce a reaction mixture having the desired molar ratios of reactants depending upon the particular type of zeolite to be produced. The reaction mixture may then be allowed to digest at ambient temperature for periods of up to 40 hours or more, in order to aid crystallization. It is then heated at 180° to 250° F., e.g. 200° to 220° F., for a sufficient period to crystallize the product, e.g. up to 200 hours or more, typically 50 to 100 hours. The crystalline, metallo alumino-silicate zeolite is separated from the aqueous mother liquor by decantation or filtration and washed to recover a crystalline product.

The above procedure is utilized for the production of zeolites having the synthetic faujasite structure utilizing appropriate reaction mole ratios as described, for example, in U.S. Patent Nos. 2,882,244 and 3,013,988. By alteration of the reactant mole ratios, it may also be used for the preparation of zeolites having silica to alumina mole ratios of about 2.0. This type of zeolite is described, for example, in U.S. Patent No. 2,882,243 and designated therein as "Zeolite A." A somewhat altered procedure, performed at elevated temperature and pressure, may be used to produce zeolites having the synthetic mordenite structure as described, for example, in the Journal of the Chemical Society (1948), pp. 2158–2163.

The present invention is concerned with the discovery that partial substitution of a minor proportion of boria for the alumina normally contained within the silica-alumina crystal lattice structure of a crystalline alumina-silicate zeolite will improve various of its properties. For example, it has been found that the stability of such zeolites, particularly at high temperatures, is markedly improved by the incorporation of boria. This improved stability is important in such processes as gas drying, hydrocarbon conversion processes, etc.

It should be clearly understood that the boria "substitution" herein contemplated is a true incorporation of boria into the inherent crystal framework structure of the zeolite rather than a subsequent modification of the zeolite composition. The boria is derived from a suitable source material to be hereinafter described, which source material serves as a reactant in the crystallization process. The zeolite is thus formed from a reaction mixture similar to those previously described except that a small amount of a boria source material is included in place of a like amount of the alumina source material. The final crystalline product is crystallized out of a boria-containing reaction mixture with the boria already contained within the crystal framework prior to physical separation of the product from the mother liquor. It will be understood, therefore, that modification of the crystallized zeolite subsequent to its formation, using such techniques as metal impregnation or deposition, ion exchange, etc., is to be clearly distinguished from the process of the present invention.

The novel composition of the present invention may be characterized as a synthetic crystalline anhydrous alumino-silicate zeolite containing a minor amount of boria incorporated into its crystal lattice structure. The zeolite product is prepared from reaction mixtures similar to those of the prior art except for partial replacement of alumina with boria. Generally, the amount of boria incorporated into the final product should be sufficient to impart improved high temperature stability to the crystal network. More specifically, the amount of boria in the final product will usually be about 0.1 to about 10 wt. percent, preferably 0.5 to 4 wt. percent, most preferably 0.5 to 2.0 wt. percent.

Still more specifically, the crystalline zeolite products of the present invention may be represented by the following general formula expressed in terms of oxide mole ratios:

$$0.9 \pm 0.2 M_{2/n}O : (1-Y)Al_2O_3 : XSiO_2 : YB_2O_3$$

wherein M is selected from the group consisting of hydrogen, monovalent and divalent metal cations, and mixtures thereof; $n$ is its valence; Y has a value of from about 0.01 to about 0.5, preferably 0.05 to 0.25, and most preferably 0.10 to 0.20; and X has a value of from about 1.5 to about 12, said value being dependent upon the particular type of zeolite. For the synthetic faujasite type, X has a value of from about 2 to about 6, preferably 4 to 5.5, and most preferably 5.0 to 5.5. For the synthetic mordenite type, X has a value of from about 8 to about 12, preferably 9.5 to 10.5, and most preferably $10 \pm 0.1$. For the "Zeolite A" type, X has a value of about 1.5 to about 5, preferably 1.9 to 3, and most preferably $2 \pm 0.1$.

In the zeolites prepared by known procedures, the cation represented by M in the above formula will usually be a monovalent alkali metal cation, e.g. sodium, lithium or potassium cation. Of the latter, sodium cation will be especially preferred. Additionally, the cation M can be partially or completely exchanged by conventional ion-exchange techniques with a variety of monovalent and divalent cations. Preferred replacement cations will include hydrogen, calcium, and magnesium cations.

In accordance with the present invention, the novel crystalline alumino-silicate zeolites containing minor amounts of boria are prepared from reaction mixtures containing five principal reactants; namely, alkali metal oxide (e.g. $Na_2O$) silica ($SiO_2$), alumina ($Al_2O_3$), boria ($B_2O_3$), and water ($H_2O$), which reactants are supplied by suitable source materials. For example, alumina may be added in the form of alkali aluminate, alumina gel, alumina sol and the like; silica in the form of alkali silicates and/or silica gel and/or silica sol, etc., with silica sol being preferred; alkali metal oxide in the form of the hydroxide, or combined with alumina or silica; and boria in the form of sodium tetraborate, sodium metaborate, boron oxide, etc.

For example, a boria-substituted synthetic faujasite is prepared using reactant proportions determined from the following molar ratios:

TABLE I

| | General | Preferred | Specific |
|---|---|---|---|
| $SiO_2/(Al_2O_3+B_2O_3)$ | 3–12 | 6–10 | 7–8 |
| $Na_2O/(Al_2O_3+B_2O_3)$ | 1.0–4.0 | 1.5–3.0 | 2.0–2.4 |
| $B_2O_3/(Al_2O_3+B_2O_3)$ | 0.01–0.50 | 0.05–0.40 | 0.10–0.20 |
| $H_2O/SiO_2$ | 3–20 | 6–12 | 7–10 |

The above reactants are thoroughly mixed at ambient temperature; preferably held for a digestion period of about 1 to 15 hours, preferably 1 to 10 hours, at about ambient temperature, e.g. about 50 to 120° F., preferably 60 to 100° F.; heated to elevated temperature of about 180 to 250° F., preferably 200 to 230° F.; and held at such temperature for a sufficient time to form the crystalline zeolite product. Crystallization times of about 6 to 200 hours or longer, preferably 6 to 72 hours, and more preferably 24 to 60 hours, have been found suitable. The crystallization process is usually terminated at the point of maximum crystallinity (as determined by periodic analysis) by quenching with excess water. The product is then separated from the reaction mixture by conventional solids separation techniques, e.g. filtration, centrifugation, etc., washed thoroughly, and dried at elevated temperature, e.g. 220 to 280° F. The product crystals, after separation from the mother liquor and thorough washing, may be activated by heating to elevated temperature, e.g. 300 to 450° C., to remove water of hydration and to produce a substantially anhydrous product which is suitable for use as an adsorbent and catalytic material.

As another illustration, a boria-substituted "Zeolite A" may be prepared by substantially the same procedure using molar ratios of reactants falling in either of the following ranges:

| | Range 1 | Range 2 |
|---|---|---|
| $SiO_2/(Al_2O_3+B_2O_3)$ | 0.5–1.3 | 1.3–2.5 |
| $Na_2O/(Al_2O_3+B_2O_3)$ | 0.5–3.9 | 1.0–7.5 |
| $B_2O_3/(Al_2O_3+B_2O_3)$ | 0.01–0.5 | 0.01–0.5 |
| $H_2O/SiO_2$ | 35–600 | 35–600 |

As a further illustration, a boria-substituted synthetic mordenite may be prepared by crystallization of a mixture having the following molar ratios of reactants:

$SiO_2/(Al_2O_3+B_2O_3)$ ———————————— 8–12
$Na_2O/(Al_2O_3+B_2O_3)$ ———————————— 1–3
$B_2O_3/(Al_2O_3+B_2O_3)$ ———————————— 0.01–0.5
$H_2O/SiO_2$ ———————————— 3–75

The crystallization step may be performed under pressure in a sealed vessel at a temperature of about 500 to 575° F. for a crystallization time of about 8 to 72 hours, with the pH of the reaction mixture being maintained above about 8, e.g. 8 to 10.5.

It should be understood that the scope of the present invention is not intended to be limited to any of the various types of crystalline alumino-silicate zeolites or preparation procedures hereinbefore described. Rather, the discovery of the stabilizing effect of boria on the crystalline zeolitic structure is pertinent to a wide variety of synthetic zeolites, regardless of the particular method of preparation utilized. For example, the preparation of synthetic zeolites utilizing a quaternary ammonium compound of the formula $N(R)_4OH$, wherein R is an alkyl group, e.g. $N(CH_3)_4OH$, as a principal reactant in the crystallization mixture has been described in the art, e.g., Belgian Patent No. 615,311. Zeolites prepared by such procedures are intended to be included within the scope of the present invention.

In addition to their use as adsorbents, certain of the crystalline zeolites, particularly those having uniform pore openings of about 6 to about 15 Angstrom units and silica to alumina ratios above about 3, have been found to be valuable catalytic materials for hydrocarbon conversion processes. In such applications, e.g. catalytic cracking, base exchange with a metal or hyrogen-containing cation is usually desirable so as to reduce the alkali metal oxide content (e.g. $Na_2O$) to less than 10 wt. percent, preferably about 1 to 5 wt. percent, based on the weight of zeolite crystals. The metal cation can be any metal of Groups I to VIII and the rare earth metals, but preferably is a member of the group consisting of Groups II, III, IV, V, VI–B, VII–B, VIII and rare earth metals. Particularly preferred for cracking are the alkaline earth metals and especially magnesium and/or calcium. Ion exchange may be accomplished by slurrying the zeolite product with an aqueous solution of the desired cation to replace the alkali metal and washing the resulting base-exchanged material free of soluble ion prior to drying. The zeolite is exchanged with a suitable salt solution of the above metals or the hydrogen-containing cation at temperatures of about 60 to 150° F. via conventional ion exchange techniques. Suitable salt solutions include, for example, magnesium sulfate, calcium chloride, barium chloride, iron sulfate, ammonium hydroxide, ammonium chloride, etc.

The above ion-exchanged zeolites can be further modified for certain applications, such as hydrocracking, by impregnation with a suitable metal, e.g. a hydrogenating metal. For example, platinum group metals such as palladium, platinum and rhodium, or other metals such as molybdenum, chromium, vanadium, cobalt, nickel, copper, silver and manganese may be deposited on the base-exchanged crystalline alumino-silicate zeolite. Preferably, the zeolites are first decationized by base exchange with ammonium or hydrogen ions and then treated with the appropriate metal salt or ammonium complex of the metal, e.g. ammonium chloroplatinate, palladium chloride, etc. The amount of metal in the finished catalyst is generally between about 0.01 to 5.0 wt. percent, preferably 0.1 to 3.0 wt. percent, based on dry zeolite.

The zeolitic catalyst may be utilized for catalytic conversions in the above-described forms or may be suitably embedded in an amorphous material such as silica gel, or a cogel of silica and at least one other metal oxide, wherein the metal is selected from Groups II-A, III-A and IV-B of the Periodic Table, e.g. alumina, titania, magnesia, etc. The use of such composite materials, e.g. crystalline noble metal-containing zeolite embedded in silica-alumina cogel matrix, has been found useful in fluidized and moving bed operations since they may be readily formed into particles of a desired size. The composites may be formed by incorporating the zeolite crystals into a suitable hydrogel, e.g. silica-alumina hydrogel; subjecting the mixture to high agitation conditions with added water, if necessary, to produce a homogeneous fluid dispersion; and finally spray drying the resulting mixture. The final composite may contain 5 to 80 wt. percent zeolite.

The invention will be further understood by the following examples, which are given for illustrative purposes only and are not intended to limit the scope of the invention.

*Example 1*

A number of boria-containing zeolites of the synthetic faujasite type having pore openings of about 6 to 15 A. were prepared by the following typical procedure. A solution of (1) commercial sodium aluminate containing 38 wt. percent $Na_2O$, 38 wt. percent $Al_2O_3$, and 24 wt. percent $H_2O$, and (2) sodium tetraborate containing 18 wt. percent $B_2O_3$, and (3) sodium hydroxide containing 75 wt. percent $Na_2O$ in water was added to (4) a commercially available aqueous sol of colloidal silica containing 30 wt. percent $SiO_2$ ("Ludox" solution supplied by E. I. du Pont de Nemours & Co.), under rapid stirring conditions at ambient temperature, e.g. about 75° F. Each ingredient was added in an amount calculated to give the desired molar composition in the resulting reaction mixture. The reaction mixture was then aged for a digestion period of about 2 hours at ambient temperature and subsequently heated in an oven maintained at a temperature of about 210° F. until the product sufficiently crystallized.

The crystallization period was determined by the length of time necessary to produce maximum crystallinity of product. It has been found that there is an optimum crystallization time depending upon the particular reaction mixture after which the crystallinity of the product may decline. Accordingly, the product crystallinity throughout the crystallization period was determined by periodically withdrawing and analyzing (by X-ray diffraction) a sample of crystals from the slurry mixture. The crystallization period for maximum crystallinity is indicated for each of the runs hereinafter set forth.

The crystallization step was terminated at the point of maximum crystallinity by quenching the reaction mixture with cold water, e.g. about 0.5 volume of 60° F. water per volume of reaction mixture. The crystalline product was separated from the mother liquor by filtration, thoroughly water washed and finally dried at a temperature of about 130° C.

Percent crystallinity is hereby defined as the ratio between the sum of the intensities of the ten strongest lines of the X-ray diffraction pattern of the unknown sample and the sum of the intensities of the same ten lines in the pattern of a standard laboratory sample, multiplied by 100. The sum of the intensities of the ten strongest lines for the standard laboratory sample was 172. The crystallinity is thus expressed as a percent of the standard laboratory sample crystallinity and may be simply calculated by dividing the sum of the intensities of the ten strongest lines of the X-ray diffraction trace by the constant 1.72.

Various preparations of boria-containing crystalline zeolites were performed using the above procedure, and are summarized in the following table wherein the molar ratios of the various ingredients are indicated.

TABLE II

| Run | Composition of Reaction Mixture | | | | Crystallization Time,[1] Days | Product Analysis | | | | | |
|---|---|---|---|---|---|---|---|---|---|---|---|
| | $SiO_2/(Al_2O_3+B_2O_3)$ | $Na_2O/(Al_2O_3+B_2O_3)$ | $B_2O_3/(Al_2O_3+B_2O_3)$ | $H_2O/SiO_2$ | | Crystallinity [2] | Composition, Weight Percent | | | | |
| | | | | | | | $Al_2O_3$ | $Na_2O$ | $SiO_2$ | $B_2O_3$ | |
| 1 | 7.0 | 2.4 | 0.10 | 10.0 | 1 | 171 | 20.3 | 14.0 | 64.2 | 0.7 | |
| 2 | 7.0 | 2.4 | 0.20 | 10.0 | 3 | 210 | 21.4 | 15.9 | 63.0 | 1.6 | |
| 3 | 10.0 | 3.0 | 0.20 | 12.0 | 8 | 124 | 19.2 | 13.7 | 68.3 | 0.7 | |

[1] Crystallization time at about 210° F. which produced maximum crystallinity.
[2] Percent of crystallinity of standard sample.

*Example 2*

The products of Runs 1 and 2 of Example 1 were tested for high temperature stability, together with a product containing 0 wt. percent boria, which was prepared in Run 4 using the same formulation as Run 1, with the exception that the boria was excluded and replaced by an equivalent amount of alumina.

The products of Runs 1, 2 and 4 were ion-exchanged with magnesium sulfate solution to form the magnesium form of the zeolite. They were then calcined at 900° F., and steamed at 1200° F., at 1 atmosphere pressure, for 16 hours. The crystallinities of the products after steaming were then measured and compared to the initial crystallinities as shown below.

TABLE III

| Product | Percent $B_2O_3$ | Crystallinity | |
|---|---|---|---|
| | | Before Steaming | After Steaming |
| 1 | 0.7 | 157 | 69 |
| 2 | 1.6 | 94 | 113 |
| 4 | 0 | 169 | 24 |

As shown above, the boria-containing samples retained their crystallinities to a greater degree than the samples containing 0% boria.

Additionally, the products of Runs 1 and 4 were heated in dry nitrogen for 2 hours at 1750° F. The product of Run 1 retained a significant proportion of its zeolite structure, whereas the product of Run 4 completely decomposed.

The improved high temperature stability of boria-containing crystalline zeolites is thus demonstrated.

Example 3

A boria-containing crystalline zeolite having the "Zeolite A" structure with pore openings of about 13 A. is prepared by the typical procedure of Example 1, with the reaction mixture containing the following molar ratios of ingredients:

| | |
|---|---|
| $SiO_2/(Al_2O_3+B_2O_3)$ | 1.0 |
| $Na_2O/(Al_2O_3+B_2O_3)$ | 1.6 |
| $B_2O_3/(Al_2O_3+B_2O_3)$ | 0.2 |
| $H_2O/SiO_2$ | 59 |

A crystalline synthetic zeolite having improved high temperature stability is produced.

Example 4

A boria-containing crystalline zeolite having a mordenite structure with pore openings of about 10 A. is prepared by crystallization of a reaction mixture having the following molar ratios of ingredients:

| | |
|---|---|
| $SiO_2/(Al_2O_3+B_2O_3)$ | 10.0 |
| $Na_2O/(Al_2O_3+B_2O_3)$ | 1.0 |
| $B_2O_3/(Al_2O_3+B_2O_3)$ | 0.2 |
| $H_2O/SiO_2$ | 5 |

The ingredients are supplied by suitable source materials similar to those previously described. A preferred method of performing the crystallization is to prepare a gel having the above composition, evaporate to a thick consistency at a temperature of about 160° F., replace the evaporated water, and heat the mixture in a sealed autoclave at about 550° to 570° F. for about two days. The pH of the cold mother liquor after crystallization should be about 9.0.

A crystalline synthetic mordenite having improved high temperature stability is produced.

Example 5

To demonstrate the utility of the zeolite products of the present invention, the products of Example 1 (Run 2), Example 3 and Example 4 are modified to form hydrocracking catalysts. This is accomplished by separately slurrying 500 grams of the sodium form of each zeolite in one liter of water and base-exchanging with an ammonium ion solution. One lb. $NH_4Cl$ dissolved in 1500 ml. $H_2O$ and 250 ml. concentrated $NH_4OH$ (28% $NH_3$) is suitable for this purpose. The base-exchange is performed at ambient temperature by stirring the combined mixture intermittently for three hours, decanting the liquid, and washing the zeolite with 500 ml. $H_2O$. This operation is repeated two times with fresh $NH_4OH$-$NH_4Cl$ solution.

The resulting ammonium form of each zeolite is then impregnated with palladium metal by contacting the zeolite with a palladium chloride solution of the desired concentration. After washing, the material is then heated at 400° F. for 2 hours, at 550° F. for 4 hours, and at 650° F. for 2 hours to drive off ammonia. The impregnated zeolite contains 0.65 wt. percent palladium.

The resulting catalysts are then separately evaluated for hydrocracking activity by contact with a heavy virgin gas oil feed having a boiling range of 680° to 1100° F., a gravity of 27° A.P.I., and an aniline point of 160° F. A fixed bed operation is used at a pressure of 1500 p.s.i.g., a temperature of 750° F., a space velocity of 1.0 v./hr./v. and a hydrogen flow rate of 8000 cubic feet per barrel of feed. In each case, a substantial portion of the feed is converted to lower boiling cracked products.

Example 6

To illustrate the use of the zeolite products of the present invention in catalyitc cracking operations, the synthetic boria-containing mordenite product of Example 4 is modified to form a cracking catalyst. This is accomplished by treating the sodium form mordenite with dilute acid to reduce its $Na_2O$ content. The resulting hydrogen-form mordenite contains about 0.9 wt. percent $Na_2O$ and is evaluated for cracking activity in a fixed-bed catalytic cracking unit by contact with a cetane feed stream at atmospheric pressure, 832° F., and at a space velocity of 3.9 to 4.2 w./hr./w. A substantial portion of the feed stream is converted to lower boiling products.

The above hydrogen-form mordenite may be further modified by ion exchange with cations of calcium, magnesium, aluminum, and rare earth metals. For example, the magnesium and aluminum forms of boria-containing mordenite are formed by appropriate base exchange reactions with suitable solutions of these ions. Use of the resulting products in the above catalytic cracking operation again results in a substantial conversion to lower boiling products.

Example 7

The synthetic faujasite product of Example 1, Run 2, Table II, having uniform pore openings of about 13 A., is modified by base exchange with a 12% $MgCl_2$ solution. 500 grams of zeolite are slurried in 1500 cc. of solution. The liquid is decanted, and the solids are washed. After three such exchanges, the zeolite is dried at 250° F. and calcined at 850° F. On analysis, the $Na_2O$ content has been reduced by about 75%.

The resulting magnesium-form zeolite is evaluated for cracking activity by contact with an East Texas light gas oil in a fixed bed unit at 850° F. and 0.6 v./v./hr. A substantial portion of the feed is converted to lower boiling products.

It is to be understood that the present invention is not intended to be restricted to the examples set forth above, and that minor modifications may be made without departing from the spirit of the invention.

What is claimed is:

1. A synthetic crystalline alumino-silicate zeolite containing boria as an integral part of its crystal framework, said framework being characterized by uniformly dimensioned pore openings.

2. A synthetic crystalline metallo alumino-silicate zeolite containing a minor amount of boria sufficient to impart improved high temperature stability to said zeolite, said boria forming an integral part of the crystal framework of said zeolite, said framework being characterized by uniformly dimensioned pore openings.

3. A synthetic crystalline anhydrous metallo aluminosilicate zeolite containing about 0.1 to about 10 wt. percent boria as an integral part of its crystal lattice structure, said structure being characterized by uniformly dimensioned pore openings.

4. A synthetic crystalline anhydrous metallo aluminosilicate zeolite containing a minor amount of boria as an integral part of the crystal framework of said zeolite, said zeolite being selected from the group consisting of synthetic faujasite, synthetic mordenite and Zeolite A.

5. A synthetic crystalline anhydrous metallo aluminosilicate zeolite having uniformly dimensional pore openings and the following molar ratios of constituents:

$$0.9\pm0.2 M_{2/n}O : (1-Y)Al_2O_3 : XSiO_2 : YB_2O_3$$

wherein M is selected from the group consisting of hydrogen, monovalent and divalent cations, and mixtures thereof; $n$ is its valence; X has a value of from about 1.5 to about 12; and Y has a value of from about 0.01 to about 0.5.

6. A synthetic crystalline anhydrous zeolite according to claim 5, having a faujasite structure, wherein X has a value of about 2 to about 6, and M represents an alkali metal cation.

7. A synthetic crystalline anhydrous zeolite according to claim 5 having a mordenite structure, wherein X has a value of about 8 to about 12, and M represents an alkali metal cation.

8. A synthetic crystalline anhydrous zeolite according to claim 5 having a Zeolite A structure, wherein X has a value of about 1.5 to about 5, and M represents an alkali metal cation.

9. A process for preparing a synthetic crystalline sodium alumino-silicate zeolite of the faujasite type having the following molar ratios of constituents:

$$0.9 \pm 0.2 Na_2O : (1-Y) Al_2O_3 : X SiO_2 : Y B_2O_3$$

wherein X has a value of from about 2 to about 6, and Y has a value of from about 0.01 to about 0.5; which process comprises crystallizing said zeolite from an aqueous reaction mixture containing $Na_2O$, $SiO_2$, $Al_2O_3$ and $B_2O_3$, at elevated temperature, wherein the molar ratios of the constituents in said reaction mixture are within the following ranges:

| | |
|---|---|
| $SiO_2/(Al_2O_3+B_2O_3)$ | 3–12 |
| $Na_2O/(Al_2O_3+B_2O_3)$ | 1.0–4.0 |
| $B_2O_3/(Al_2O_3+B_2O_3)$ | 0.01–0.50 |
| $H_2O/SiO_2$ | 3–30 | and recovering the crystallized product.

10. The process of claim 9 wherein said elevated temperature is within the range of about 180° to 250° F. and said reaction mixture is aged at said temperature for a sufficient time to crystallize said zeolite.

11. The process of claim 10 wherein said reaction mixture is aged at said temperature for a period of about 6 to 200 hours.

12. The process of claim 11 which additionally comprises aging said reaction mixture for a period of about 1 to 15 hours at a temperature of about 50 to 120° F. prior to crystallization at said elevated temperature.

13. A process for preparing a synthetic crystalline alumino-silicate zeolite of the faujasite type having the following molar ratios of constituents:

$$0.9 \pm 0.2 Na_2O : (1-Y) Al_2O_3 : X SiO_2 : Y B_2O_3$$

wherein X has a value of from about 4 to 5.5, and Y has a value of from about 0.05 to about 0.25; which process comprises preparing an aqueous reaction mixture containing $Na_2O$, $SiO_2$, $Al_2O_3$ and $B_2O_3$, wherein the molar ratios of the constituents in said reaction mixture are within the following ranges:

| | |
|---|---|
| $SiO_2/(Al_2O_3+B_2O_3)$ | 6–10 |
| $Na_2O/(Al_2O_3+B_2O_3)$ | 1.5–3.0 |
| $B_2O_3/(Al_2O_3+B_2O_3)$ | 0.05–0.40 |
| $H_2O/SiO_2$ | 6–12 | maintaining said reaction mixture at about ambient temperature for about 1 to 15 hours; heating said reaction mixture to between about 200° F. to about 230° F.; maintaining said reaction mixture at between about 200° F. and about 230° F. for a sufficient period of time to crystallize said alumino-silica zeolite; and separating said crystallized zeolite from the mother liquor.

14. The process of claim 13 wherein said reaction mixture is maintained at between about 200° F. and about 230° F. for about 24 to 60 hours.

15. A process for preparing a synthetic crystalline alumino-silicate zeolite of the Zeolite A type having the following molar ratios of constituents:

$$0.9 \pm 0.2 Na_2O : (1-Y) Al_2O_3 : X SiO_2 : Y B_2O_3$$

wherein X has a value of from about 1.5 to about 5, and Y has a value of from about 0.01 to about 0.5; which process comprises crystallizing said zeolite from an aqueous mixture containing $Na_2O$, $SiO_2$, $Al_2O_3$ and $B_2O_3$, at a temperature within the range of about 180° to 250° F., wherein the molar ratios of the constituents in said reaction mixture are within the following ranges:

| | |
|---|---|
| $SiO_2/(Al_2O_3+B_2O_3)$ | 0.5–1.3 |
| $Na_2O(Al_2O_3+B_2O_3)$ | 0.5–3.9 |
| $SiO_2/(Al_2O_3+B_2O_3)$ | 0.6–1.3 |
| $B_2O_3/(Al_2O_3+B_2O_3)$ | 0.01–0.5 |
| $H_2O/SiO_2$ | 35–600 | and recovering the crystallized product.

16. The process of claim 15, wherein said molar ratios are within the following ranges:

| | |
|---|---|
| $SiO_2/(Al_2O_3+B_2O_3)$ | 1.3–2.5 |
| $Na_2O/(Al_2O_3+B_2O_3)$ | 1.0–7.5 |
| $B_2O_3/(Al_2O_3+B_2O_3)$ | 0.01–0.5 |
| $H_2O/SiO_2$ | 35–600 |

17. The zeolite of claim 3 which has uniform pore openings of about 6 to about 15 Angstrom units.

18. The zeolite of claim 5 wherein M is an alkali metal cation.

19. The zeolite of claim 5 wherein M represents a mixture of alkali metal cation and at least one cation readily exchangeable with said alkali metal cation, and wherein the alkali metal oxide content of said zeolite is less than about 10 wt. percent.

20. The zeolite of claim 19 which has uniform pore openings of about 6 to about 15 Angstrom units.

21. The zeolite of claim 6 wherein said alkali metal cation has been exchanged with at least one cation which is readily exchangeable with said alkali metal cation to thereby reduce the alkali metal oxide content of said zeolite to less than about 10 wt. percent.

22. The zeolite of claim 21 wherein said cation readily exchangeable with said alkali metal cation is a hydrogen-containing cation.

23. The zeolite of claim 21 wherein said cation readily exchangeable with said alkali metal cation is a magnesium cation.

References Cited

UNITED STATES PATENTS

| | | | |
|---|---|---|---|
| 1,840,450 | 1/1932 | Jaeger et al. | 208—120 |
| 2,983,670 | 5/1961 | Seubold | 208—110 |
| 3,039,953 | 6/1962 | Eng | 208—120 |
| 3,125,511 | 3/1964 | Tupman et al. | 208—112 |
| 3,132,087 | 5/1964 | Kelly et al. | 208—59 |
| 3,140,322 | 7/1964 | Frilette et al. | 252—455 X |

FOREIGN PATENTS

| | | |
|---|---|---|
| 104,008 | 2/1918 | Great Britain. |

OTHER REFERENCES

Barrer et al., "Jr. Chemical Soc." 1959, pages 195–207.

OSCAR R. VERITZ, *Primary Examiner.*

A. D. SULLIVAN, EDWARD J. MEROS,
*Examiners.*

A. RIMENS, *Assistant Examiner.*